United States Patent
Gao et al.

(10) Patent No.: US 8,379,566 B2
(45) Date of Patent: Feb. 19, 2013

(54) SYNCHRONIZATION METHOD AND SYNCHRONIZATION APPARATUS OF COMMUNICATION SYSTEM

(75) Inventors: Zhuo Gao, Beijing (CN); Yawei Liu, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 338 days.

(21) Appl. No.: 12/744,771

(22) PCT Filed: Nov. 4, 2008

(86) PCT No.: PCT/CN2008/072926
§ 371 (c)(1),
(2), (4) Date: Jun. 3, 2010

(87) PCT Pub. No.: WO2009/067876
PCT Pub. Date: Jun. 4, 2009

(65) Prior Publication Data
US 2010/0309929 A1    Dec. 9, 2010

(30) Foreign Application Priority Data
Nov. 27, 2007    (CN) .......................... 2007 1 0178165

(51) Int. Cl.
*H04B 7/212*    (2006.01)
*H04J 3/06*    (2006.01)

(52) U.S. Cl. ...................................... 370/324; 370/503

(58) Field of Classification Search .................. 370/324, 370/350, 503, 508
See application file for complete search history.

(56) References Cited

U.S. PATENT DOCUMENTS

| 2005/0055467 A1* | 3/2005 | Campana et al. ............. 709/253 |
| 2006/0030902 A1* | 2/2006 | Quiles et al. ..................... 607/60 |
| 2007/0221833 A1* | 9/2007 | Yeom et al. ................... 250/251 |
| 2007/0254598 A1* | 11/2007 | Bachl et al. ...................... 455/73 |

(Continued)

FOREIGN PATENT DOCUMENTS

| CN | 1308430 A | 8/2001 |
| CN | 1383623 A | 12/2002 |

(Continued)

OTHER PUBLICATIONS

International Search Report for International Application No. PCT/CN2008/072926, dated Feb. 5, 2009.

*Primary Examiner* — Andrew Lee
(74) *Attorney, Agent, or Firm* — Barnes & Thornburg LLP (57) ABSTRACT

The present invention discloses a method and an apparatus for synchronization in a communication system, the method includes: detecting whether a user equipment is in an uplink out-of-synchronization state; triggering, by a downlink scheduling entity, an uplink enhanced random access synchronization process, if the user equipment is in the uplink out-of-synchronization state; and obtaining, by an uplink scheduling entity, a user equipment identifier sent by the user equipment on which the uplink enhanced random access synchronization process is triggered, and informing the downlink scheduling entity via an interaction with the downlink scheduling entity that uplink synchronization of the user equipment is restored. By employing the method and the apparatus of the invention, the uplink synchronization is accomplished by using the existing enhanced random access technology of the current system and via the interaction between the uplink and downlink scheduling entities, the delay of the synchronization may be shortened effectively, the data transmission efficiency and the system resource utilization are improved, and the normal sending and transmitting of the downlink data may be guaranteed.

18 Claims, 3 Drawing Sheets

U.S. PATENT DOCUMENTS

| | | |
|---|---|---|
| 2007/0254656 A1 | 11/2007 | Dalsgaard |
| 2008/0045228 A1* | 2/2008 | Zhang et al. .................. 455/450 |
| 2008/0267105 A1* | 10/2008 | Wang et al. ................... 370/311 |
| 2008/0310395 A1* | 12/2008 | Kashima ....................... 370/350 |
| 2008/0320171 A1* | 12/2008 | Walsh et al. ................. 709/247 |
| 2009/0109838 A1* | 4/2009 | Kuo .............................. 370/216 |
| 2010/0020712 A1* | 1/2010 | Lee et al. ...................... 370/252 |

FOREIGN PATENT DOCUMENTS

| | | |
|---|---|---|
| CN | 1949891 A | 4/2007 |
| CN | 1992556 A | 7/2007 |

* cited by examiner

SYNCHRONIZATION METHOD AND SYNCHRONIZATION APPARATUS OF COMMUNICATION SYSTEM

CROSS-REFERENCE TO RELATED APPLICATIONS

The present application claims the benefit of priority to International Patent Application No. PCT/CN2008/072926 filed on 4 Nov. 2008, which further claims the benefit of priority to Chinese Patent Application No. 200710178165.8 filed with State Intellectual Property Office of the People's Republic of China on Nov. 27, 2007, titled "METHOD AND APPARATUS FOR SYNCHRONIZATION IN COMMUNICATION SYSTEM", the contents of which are incorporated herein by reference in its entirety.

FIELD OF THE INVENTION

The present invention relates to the field of mobile communication technologies, and in particular, to a method and apparatus for synchronization in a communication system.

BACKGROUND OF THE INVENTION

At present, in a mobile communication system, especially in a Time Division Duplex (TDD) system, a User Equipment keeps synchronous with the network side during data communication with the network side, in order to effectively receive and send data. In the existing system, for example, in the 3rd Generation Partnership Project Release 4 (3GPP R4) standard, synchronization is usually implemented via a dedicated channel in that: when no data is sent by a User Equipment or the network side for a long time, a special sequence is sent on the dedicated channel periodically for maintaining the synchronization; according to the special sequence sent by the User Equipment, the network side determines and notifies the User Equipment of a timing advance for transmitting data the next time, to assist the User Equipment to determine the subsequent transmission time and accomplish the synchronization process.

However, with increasing demands on a high-speed data service, technologies such as High Speed Downlink Packet Access (HSDPA) and High Speed Uplink Packet Access (HSUPA) are gradually introduced by the 3GPP in protocols of versions R5-R7, and downlink and uplink high-speed data services are provided over a shared channel, resources of which are centralizedly allocated by a base station scheduler of the network side.

Generally, when a user equipment does not experience data communication in a certain direction, the network side does not allocate any resource for the direction, and if a user equipment does not experience uplink and downlink data communication for a long time, the user equipment will be in an uplink out-of-synchronization state; at this point, when new data is generated, the User Equipment can perform normal data communication only if the User Equipment is re-synchronized. Specifically, when the HSDPA technology is employed in the downlink direction, the base station allocates downlink resources to the User Equipment; and after receiving data via the corresponding resources, the User Equipment decodes the data block and feeds back an ACK/NACK and information related to channel quality to the base station via an uplink control channel according to the decoding result; at this point, if the User Equipment is in the uplink out-of-synchronization state, the base station may consider the current transmission as failed because no feedback is received from the User Equipment, thus data retransmission is needed; as a result, a waste of system resources may be caused. Similarly, when the HSUPA technology is employed in the uplink direction, if uplink data transmission is performed without uplink synchronization, it is possible that the base station cannot receive the data correctly.

In view of the above problem, a method for keeping the User Equipment always in a synchronization state by periodically maintaining the uplink synchronization is usually employed in the prior art; however, for some services with a low activity coefficient such as a World Wide Web (WWW) service, it is possible that no data is sent for a long time, and in this case, it is less meaningful to maintain the synchronization of the User Equipment; further, the system resources may be wasted.

In addition, there exists still another method in the prior art, in which an enhanced random access process is introduced on the basis of HSUPA technologies, for reporting an uplink buffer state to the base station when the User Equipment has not been scheduled for a long time so as to get the synchronization of the User Equipment. Specifically, the User Equipment sends an enhanced random access sequence code to the base station, the base station determines timing advance information according to a signal delay received and feeds back an instruction to the User Equipment via a Fast Physical Access Channel (FPACH); after receiving the instruction from the base station, the User Equipment adjusts the transmission time of its uplink signal and notifies the base station of its buffer state via an E-DCH Random Access Uplink Control Channel (E-RUCCH), on which an uplink scheduling identifier E-RNTI (E-DCH Radio Network Temporary Identifier) of the User Equipment is carried. Therefore, when a User Equipment has uplink data for transmission and is in the out-of-synchronization state, the User Equipment is synchronized via an enhanced random access process before the subsequent data transmission.

However, in the current system, the HSDPA scheduler is located on an MAC-hs (Medium Access Layer for controlling the HSDPA) entity of the base station, and is responsible for the allocation of downlink resources and uses an HS-DSCH Radio Network Temporary Identifier (H-RNTI) to distinguish between user equipments; the scheduling of the HSUPA is accomplished by an MAC-e entity of the base station, and the user equipments are distinguished via an E-RNTI. The uplink scheduler and the downlink scheduler operate independently, and no communication exists therebetween. Thus, if there is data transmission in the downlink direction and the User Equipment is in the out-of-synchronization state, the synchronization cannot be obtained via the enhanced random access process. However, if a normal random access is employed to obtain the synchronization, a Radio Network Controller (RNC) is needed to forward the uplink information sent by the User Equipment on a Random Access Control Channel (RACH), so that the delay of the synchronization process is lengthened and the signaling overhead is increased.

SUMMARY OF THE INVENTION

The embodiments of the invention relate to a method and apparatus for synchronization in a communication system, which is used to enable the User Equipment to obtain the synchronization after the uplink out-of-synchronization, thereby effectively shortening the delay of the synchronization and improving the data transmission efficiency.

The technical solutions related to the embodiments of the invention are as follows.

A method for synchronization in a communication system, including:

detecting whether a user equipment is in an uplink out-of-synchronization state;

triggering, by a downlink scheduling entity, an uplink enhanced random access synchronization process, if the user equipment is in the uplink out-of-synchronization state; and obtaining, by an uplink scheduling entity, a user equipment identifier sent by the user equipment on which the uplink enhanced random access synchronization process is triggered, and informing the downlink scheduling entity via an interaction with the downlink scheduling entity that uplink synchronization of the user equipment is restored.

An apparatus for synchronization in a communication system, comprising: a detection module, an uplink scheduling entity module and a downlink scheduling entity module;

the detection module is adapted to detect whether a user equipment is in an uplink out-of-synchronization state;

the downlink scheduling entity module is adapted to receive a detection result sent by the detection module, and trigger an uplink enhanced random access synchronization process on the user equipment when the user equipment is in the out-of-synchronization state; and the uplink scheduling entity module is adapted to obtain a user equipment identifier sent by the user equipment on which the uplink enhanced random access synchronization process is triggered, and inform the downlink scheduling entity module via an interaction with the downlink scheduling entity module that uplink synchronization of the user equipment is restored.

In comparison with the prior art, the method and the apparatus according to the embodiments of the invention have the following beneficial effects.

The uplink synchronization is accomplished by using the existing enhanced random access technology of the current system and via the interaction between the uplink and downlink scheduling entities, the delay of the synchronization is shortened effectively, the data transmission efficiency and the system resource utilization are improved, and the normal sending and transmitting of the downlink data can be guaranteed.

DETAILED DESCRIPTION OF THE EMBODIMENTS

In embodiments of the invention, the uplink synchronization is accomplished by using the existing enhanced random access technology of the current system and via the interaction between the uplink and downlink scheduling entities, thereby guaranteeing the normal communicating and transmitting of downlink data and shortening the delay of service transmission.

Figure 1:
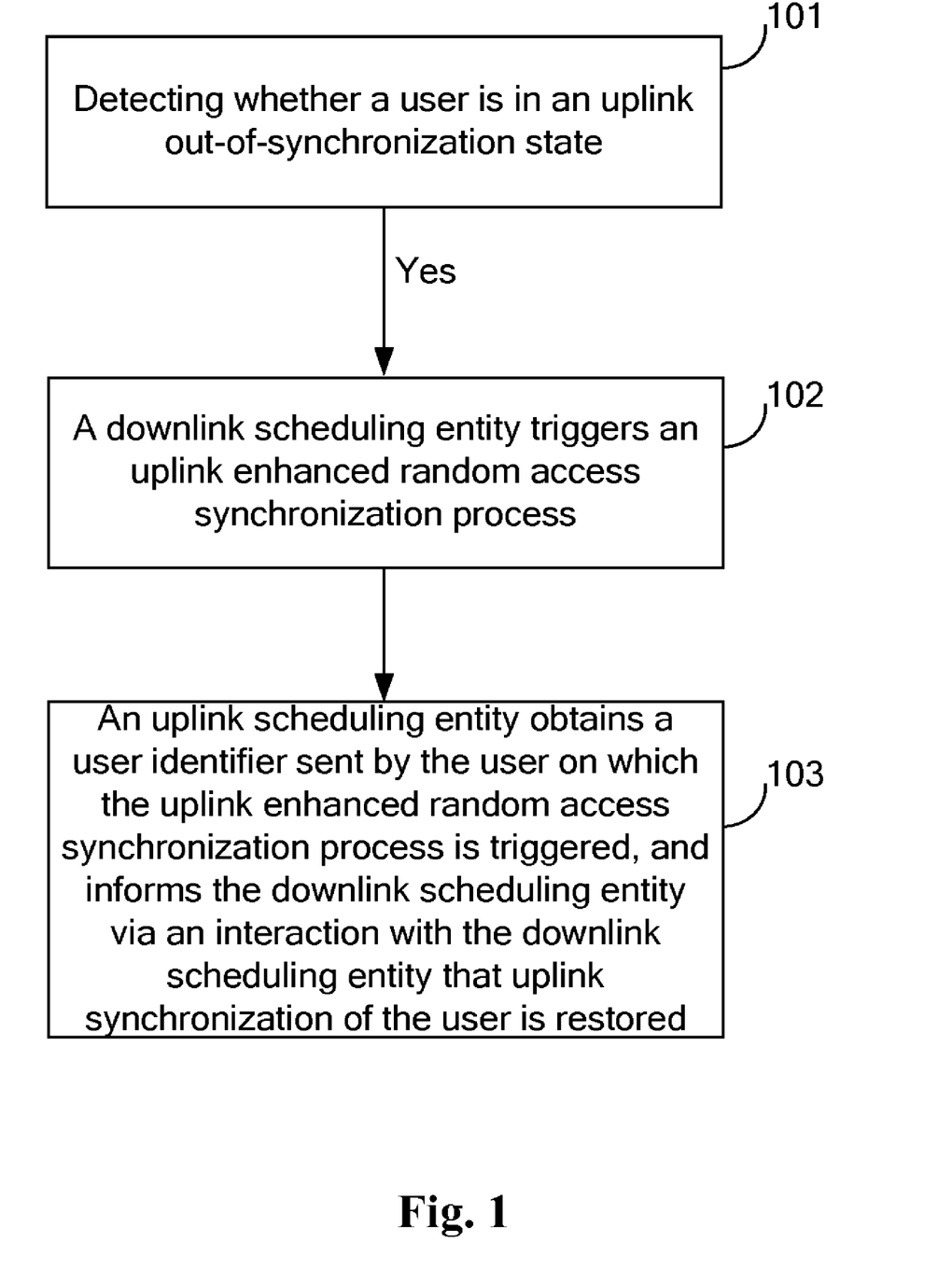
FIG. 1 is a schematic flow chart of a method according to Embodiment 1 of the invention.

For better understanding of solutions according to the embodiments of the invention by one skilled in the art, a method according to the embodiments of the invention will now be illustrated in detail in conjunction with the drawings and the embodiments. As shown in FIG. 1, the method according to Embodiment 1 of the invention includes processes 101-103.

At process 101, it is detected whether a user equipment is in an uplink out-of-synchronization state.

At process 102, a downlink scheduling entity triggers an uplink enhanced random access synchronization process if the user equipment is in the uplink out-of-synchronization state.

At process 103, an uplink scheduling entity obtains a user equipment identifier sent by the user equipment on which the uplink enhanced random access synchronization process is triggered, and informs the downlink scheduling entity via an interaction with the downlink scheduling entity that uplink synchronization of the user equipment is restored.

Specifically, the downlink scheduling MAC-hs entity triggers the uplink enhanced random access synchronization process according to a preset condition, and after obtaining the identifier of the User Equipment, the uplink scheduling MAC-e entity forwards the identifier to the downlink scheduling entity, thus accomplishing the identifying of the User Equipment to be synchronized; and after the synchronization is accomplished, the normal data transmission may be performed on the downlink.

Figure 2:
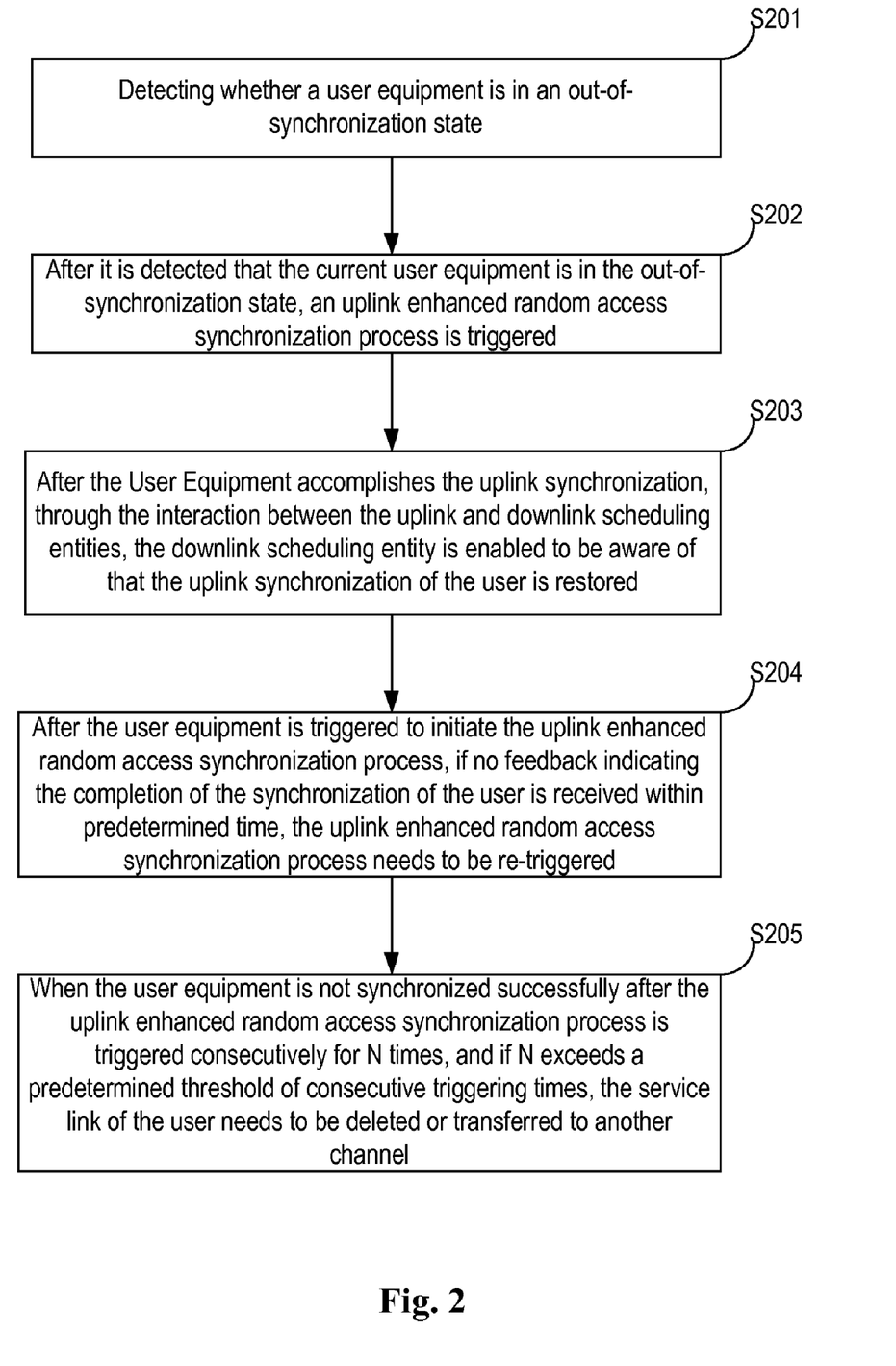
FIG. 2 is a schematic flow chart of a specific implementation of the method according to Embodiment 1 of the invention.

As shown in FIG. 2, it is detected whether a user equipment is in an out-of-synchronization state, S201; at present, there are various methods for detecting the out-of-synchronization state, while in this embodiment, an out-of-synchronization time threshold T is predetermined, and it is determined whether an interval between the current detection time and the previous time when timing advance information is sent to the user equipment exceeds the predetermined out-of-synchronization time threshold T; if the interval exceeds the predetermined out-of-synchronization time threshold T, the current user equipment is considered to be in the out-of-synchronization state.

After it is detected that the current user equipment is in the out-of-synchronization state, an uplink enhanced random access synchronization process is triggered, S202. Based on the system requirements, however, the uplink enhanced random access synchronization process may be triggered only if the user equipment is in the out-of-synchronization state and there exists downlink data to be transmitted or when the user equipment is in the out-of-synchronization state and there exists uplink data to be transmitted, detailed description of which is omitted herein. In an embodiment of the invention, the enhanced random access technology is employed by the downlink scheduling entity to trigger the uplink enhanced random access synchronization process which includes the following processes A)-D).

A): A base station instructs a user equipment to initiate an enhanced random access.

B): The user equipment sends an enhanced random access sequence code to the base station after receiving the enhanced random access instruction sent by the base station.

C): The base station determines a timing advance of the user equipment according to the arrival time of the received signal after detecting and receiving the enhanced random access sequence code sent by the user equipment, and feeds back the timing advance to the user equipment via an FPACH.

D): The user equipment adjusts the uplink transmission time according to the indication of the feedback received via the FPACH, and feeds back its identifier E-RNTI and the uplink buffer information, etc., to the base station via an E-RUCCH;

In this method, the downlink scheduling entity in the base station may instruct the initiation of the enhanced random access, while the uplink scheduling entity in the base station may receive the identifier E-RNTI of the user equipment and the buffer information, etc, detained description of which is omitted herein.

S203: After the User Equipment accomplishes the uplink synchronization, the User Equipment usually feeds back its identifier E-RNTI to the uplink scheduling entity; and through the interaction between the uplink and downlink scheduling entities, the downlink scheduling entity is enabled to be aware of that the uplink synchronization of the user equipment is restored, so that the subsequent downlink data transmission may be performed.

S204: After the user equipment is triggered to initiate the uplink enhanced random access synchronization process, if no feedback indicating the completion of the synchronization of the user equipment is received within predetermined time T1, in other words, if the downlink scheduling entity is not informed that the synchronization of the user equipment has been restored, the uplink enhanced random access synchronization process needs to be re-triggered.

S205: When the user equipment is not synchronized successfully after the uplink enhanced random access synchronization process is triggered consecutively for N times, and if N exceeds a predetermined threshold of consecutive triggering times, the service link of the user equipment needs to be deleted or transferred to another channel (for example, a dedicated channel); and the predetermined time T1 and N may both be preconfigured at an upper layer according to the requirements of the user equipment or the system.

Based on the above Embodiment 1, Embodiment 2 of the invention further proposes several modes for the base station to instruct the User Equipment to initiate the enhanced random access process.

Mode 1: The user equipment in the out-of-synchronization state is found by addressing the H-RNTI of the user equipment, then the synchronization initiating information carrying the H-RNTI is sent to the user equipment via a control channel (HS-SCCH) that is used for allocating downlink resources, to instruct the user equipment to initiate the enhanced random access.

Mode 2: The user equipment in the out-of-synchronization state is found by addressing the E-RNTI of the user equipment, then the synchronization initiating information carrying the E-RNTI is sent to the user equipment via a control channel (E-AGCH) that is used for allocating uplink resources, to instruct the user equipment to initiate the enhanced random access.

No matter which mode is employed, the E-RNTI of the user equipment is fed back via the E-RUCCH after the user equipment initiates the enhanced random access synchronization process.

Additionally, based on the above Embodiment 1 or 2, Embodiment 3 of the invention further proposes several methods for the interaction between the uplink and downlink scheduling entities, which are proposed in such a fact that the current standards have not defined that the E-RNTI and the H-RNTI of a user equipment are necessarily the same with each other.

Method 1: The uplink scheduling entity stores the E-RNTI and H-RNTI of each user equipment, determines the H-RNTI corresponding to a user equipment according to the E-RNTI of the user equipment received and obtained over an E-RUCCH, and feeds back the H-RNTI to the downlink scheduling entity; furthermore, the downlink scheduling entity has the H-RNTI of the user equipment stored thereon, and can be aware of whether the uplink synchronization of the user equipment is restored according to the H-RNTI of the user equipment that is fed back by the uplink scheduling entity.

Method 2: The downlink scheduling entity stores the E-RNTI and the H-RNTI of each user equipment; the uplink scheduling entity feeds back the E-RNTI of the user equipment received and obtained over an E-RUCCH to the downlink scheduling entity; and by determining the H-RNTI corresponding to the user equipment according to the E-RNTI received, the downlink scheduling entity can be aware of whether the uplink synchronization of the user equipment is restored.

Method 3: It is defined in the standard that the E-RNTI and the H-RNTI of a user equipment are necessarily the same with each other; thus, there is no difference between the E-RNTI identified by the uplink scheduling entity and the H-RNTI identified by the downlink scheduling entity; therefore, after obtaining the E-RNTI of a user equipment, the uplink scheduling entity feeds back the E-RNTI to the downlink scheduling entity, and the downlink scheduling entity can be aware of whether the uplink synchronization of the user equipment is restored.

However, it is easily understood by one skilled in the art that, in a practical system, there may be various causes for a user equipment to initiate an enhanced random access process, for example, the presence of downlink data to be transmitted or uplink data to be transmitted as described above; therefore, there may be various forms of the interaction between the uplink and downlink scheduling entities, one of which is already described above, that is, for each user equipment that initiates the uplink synchronization, the uplink scheduling entity feeds back the identifier corresponding to the user equipment to the downlink scheduling entity; and Embodiment 4 of the invention further proposes another form of the interaction without limitation, which is as follows:

when an uplink enhanced random access synchronization process is triggered, the downlink scheduling entity notifies the uplink scheduling entity of the identifier corresponding to the user equipment required to perform the enhanced random access synchronization; when receiving and obtaining the identifiers of all user equipments, the uplink scheduling entity selects and then feeds back the user equipment identifier corresponding to the user equipment, on which the uplink enhanced random access synchronization process is triggered by the downlink scheduling entity in the presence of downlink data to be transmitted, to the downlink scheduling entity; and after receiving the user equipment identifier sent by the uplink scheduling entity, the downlink scheduling entity may thereby determine whether the user equipment is the user equipment that causes the downlink scheduling entity to trigger a uplink enhanced random access synchronization process, if so, the subsequent normal downlink data scheduling and transmitting may be performed for the user equipment; and if not, it is ignored, and no operation is performed. Via the above processes, the interaction overhead between the entities can be effectively saved in this form.

It can be seen that, by employing the method according to the embodiments of the invention, the delay of the synchronization is shortened effectively, the data transmission efficiency and the system resource utilization are improved, and the normal sending and transmitting of the downlink data can be guaranteed.

It may be understood by one skilled in the art that, all or a part of the processes of the method according to the above embodiments may be accomplished by hardware under the control of a program, and the program may be stored in a specific storage medium.

Figure 3:
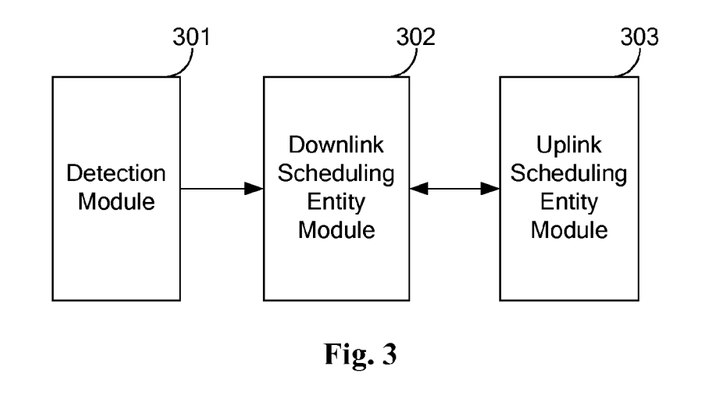
FIG. 3 is a schematic block diagram of an apparatus according to Embodiment 5 of the invention.

Accordingly, Embodiment 5 of the invention further proposes an apparatus for synchronization in a communication system, as shown in FIG. 3, and the apparatus includes a detection module 301, an uplink scheduling entity module 303 and a downlink scheduling entity module 302.

The detection module 301 is adapted to detect whether a user equipment is in an uplink out-of-synchronization state.

The downlink scheduling entity module 302 is adapted to receive a detection result sent by the detection module 301, and trigger an uplink enhanced random access synchronization process on the user equipment when the user equipment is in the out-of-synchronization state.

The uplink scheduling entity module 303 is adapted to obtain a user equipment identifier sent by the user equipment on which the uplink enhanced random access synchronization process is triggered, and inform the downlink scheduling entity module 302 via an interaction with the downlink scheduling entity module 302 that the uplink synchronization of the user equipment is restored.

The detection module further includes a determination module and an identification module.

The determination module is adapted to determine whether an interval between the current detection time and the previous time when timing advance information is sent to the user equipment is larger than a predetermined out-of-synchronization time threshold; and the identification module is adapted to receive the determination result from the determination module, identify the user equipment as in the out-of-synchronization state if the interval between the current detection time and the previous time when the timing advance information is sent to the user equipment is larger than the predetermined out-of-synchronization time threshold, and notify the downlink scheduling entity module.

Additionally, the downlink scheduling entity module includes a trigger module, which is adapted to address the user equipment by using an H-RNTI and notify the user equipment via a control channel used for allocating downlink resources, or address the user equipment by using an E-RNTI and notify the user equipment via a control channel used for allocating uplink resources, when the user equipment is in the uplink out-of-synchronization state and in the presence of downlink data to be transmitted.

Additionally, the uplink scheduling entity module includes a first storage module and a first feedback module.

The first storage module is adapted to store the E-RNTI and the H-RNTI of each user equipment; and the first feedback module is adapted to obtain the E-RNTI of a user equipment, determine the H-RNTI corresponding to the user equipment by querying the first storage module, and feed back the H-RNTI to the downlink scheduling entity module.

In addition, the downlink scheduling entity module includes a second storage module and a determination module; the second storage module is adapted to store the E-RNTI and the H-RNTI of each user equipment; the determination module is adapted to receive the E-RNTI of a user equipment fed back by the uplink scheduling entity module, and determine the H-RNTI corresponding to the user equipment by querying the second storage module.

It should be noted that the downlink scheduling entity module includes a notifying module and the uplink scheduling entity module includes a selecting module; the notifying module is adapted to notify the uplink scheduling entity module of the identifier corresponding to the user equipment on which the enhanced random access synchronization is required, when the downlink scheduling entity module triggers the uplink enhanced random access synchronization process; the selecting module is adapted to receive the user equipment identifier sent by the notifying module, and select and feed back the user equipment identifier corresponding to the user equipment, on which the uplink enhanced random access synchronization process is triggered by the downlink scheduling entity module, to the downlink scheduling entity module after the uplink scheduling entity module obtains all user equipment identifiers.

Additionally, the apparatus according to the invention further includes a first recording module and a second recording module.

The first recording module is adapted to, after the downlink scheduling entity module triggers the uplink enhanced random access synchronization process, record the a time period during which the downlink scheduling entity module does not receive a feedback indicating that the user equipment has accomplished the synchronization, and notify the downlink scheduling entity module to re-trigger the uplink enhanced random access synchronization process if the time period exceeds a predetermined time threshold.

The second recording module is adapted to record the times the downlink scheduling entity module consecutively triggers the uplink enhanced random access synchronization process, and delete the service link corresponding to the user equipment or transfer it to another channel if the times exceed a predetermined threshold of times.

Figure 4:
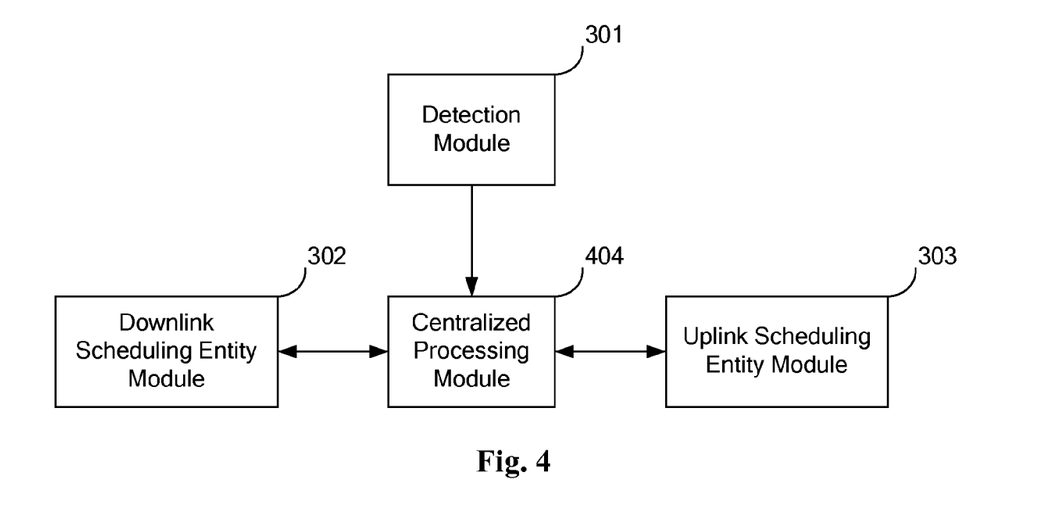
FIG. 4 is a schematic block diagram of an apparatus according to Embodiment 6 of the invention.

As shown in FIG. 4, in Embodiment 6 of the invention, the apparatus further includes a centralized processing module 404 on the basis of the above apparatus according to Embodiment 5.

The centralized processing module 404 is adapted to receive a detection result sent by the detection module and forward it to the downlink scheduling entity module, then determine whether the uplink enhanced random access synchronization process of the user equipment needs to be triggered according to the trigger request sent by the downlink scheduling entity module 302; and store the E-RNTIs and the H-RNTIs of all user equipments, determine the H-RNTI of a user equipment according to the received E-RNTI of the user equipment sent by the uplink scheduling entity module 303, and send the H-RNTI to the downlink scheduling entity module 302.

The above embodiments are only the preferred embodiments of the invention, without limiting the scope of the invention; and all modifications, equivalent substitutions and improvements made without departing from the spirit and scope of the invention are intended to be contained in the protection scope of the invention.

The invention claimed is:

1. A method for synchronization in a communication system, comprising:
   detecting whether a user equipment is in an uplink out-of-synchronization state;
   triggering, by a downlink scheduling entity, an uplink enhanced random access synchronization process, if the user equipment is in the uplink out-of-synchronization state; and
   obtaining, by an uplink scheduling entity, a user equipment identifier sent by the user equipment on which the uplink enhanced random access synchronization process is triggered, and informing the downlink scheduling entity via an interaction with the downlink scheduling entity that uplink synchronization of the user equipment is restored.

2. The method of claim 1, wherein, detecting whether the user equipment is in the uplink out-of-synchronization state comprises:
    determining whether an interval between current detection time and previous time when timing advance information is sent to the user equipment is larger than a predetermined out-of-synchronization time threshold; and
    identifying the user equipment as in the out-of-synchronization state if the interval is larger than the predetermined out-of-synchronization time threshold.

3. The method of claim 1, wherein, triggering the uplink enhanced random access synchronization process comprises:
    when the user equipment is in the uplink out-of-synchronization state, if there exists uplink or downlink data to be transmitted, instructing the user equipment to initiate the enhanced random access synchronization process.

4. The method of claim 3, wherein, instructing the user equipment to initiate the enhanced random access synchronization process comprises:
    addressing the user equipment by using an H-RNTI of the user equipment in the out-of-synchronization state, and sending synchronization initiating information instructing the initiation of the enhanced random access to the user equipment via a control channel used for allocating downlink resources; or
    addressing the user equipment by using an E-RNTI of the user equipment in the out-of-synchronization state, and sending synchronization initiating information instructing the initiation of the enhanced random access to the user equipment via a control channel used for allocating uplink resources.

5. The method of claim 1, wherein, the interaction between the uplink and downlink scheduling entities comprises:
    storing, by the uplink scheduling entity, an E-RNTI and an H-RNTI of each user equipment, determining the H-RNTI corresponding to the user equipment according to the obtained E-RNTI of the user equipment, and feeding back the H-RNTI to the downlink scheduling entity.

6. The method of claim 1, wherein, the interaction between the uplink and downlink scheduling entities comprises:
    storing, by the downlink scheduling entity, an E-RNTI and an H-RNTI of each user equipment; feeding back, by the uplink scheduling entity, the obtained E-RNTI of the user equipment to the downlink scheduling entity; and determining, by the downlink scheduling entity, the H-RNTI corresponding to the user equipment according to the received E-RNTI.

7. The method of claim 1, wherein, the interaction between the uplink and downlink scheduling entities comprises:
    defining an E-RNTI and an H-RNTI of the user equipment as the same with each other; and
    feeding back, by the uplink scheduling entity, the obtained E-RNTI to the downlink scheduling entity.

8. The method of claim 1, further comprising:
    notifying the uplink scheduling entity, by the downlink scheduling entity, of the user equipment identifier corresponding to the user equipment on which the enhanced random access synchronization is required, when the uplink enhanced random access synchronization process is triggered; and
    selecting and feeding back, by the uplink scheduling entity, the user equipment identifier corresponding to the user equipment on which the uplink enhanced random access synchronization process is triggered to the downlink scheduling entity, after obtaining all user equipment identifiers.

9. The method of claim 1, further comprising:
    after triggering the uplink enhanced random access synchronization process, re-triggering, by the downlink scheduling entity, the uplink enhanced random access synchronization process if not receiving a notification about the completion of the synchronization of the user equipment within predetermined time.

10. The method of claim 9, further comprising:
    predetermining a threshold of times the downlink scheduling entity consecutively triggers the uplink enhanced random access synchronization process; and
    deleting a service link corresponding to the user equipment or transferring the service link corresponding to the user equipment to another channel when times the downlink scheduling entity consecutively triggers the uplink enhanced random access synchronization process exceed the threshold.

11. An apparatus for synchronization in a communication system, comprising: a detection module, an uplink scheduling entity module and a downlink scheduling entity module, wherein:
    the detection module is adapted to detect whether a user equipment is in an uplink out-of-synchronization state;
    the downlink scheduling entity module is adapted to receive a detection result sent by the detection module, and trigger an uplink enhanced random access synchronization process on the user equipment when the user equipment is in the out-of-synchronization state; and
    the uplink scheduling entity module is adapted to obtain a user equipment identifier sent by the user equipment on which the uplink enhanced random access synchronization process is triggered, and inform the downlink scheduling entity module via an interaction with the downlink scheduling entity module that uplink synchronization of the user equipment is restored.

12. The apparatus of claim 11, wherein, the detection module further comprises a determination module and an identification module;
    the determination module is adapted to determine whether an interval between current detection time and previous time when timing advance information is sent to the user equipment is larger than a predetermined out-of-synchronization time threshold, and send a determination result to the identification module; and
    the identification module is adapted to receive the determination result from the determination module, identify the user equipment, of which the interval between the current detection time and the previous time when the timing advance information is sent to the user equipment is larger than the predetermined out-of-synchronization time threshold, as in the out-of-synchronization state, and notify the downlink scheduling entity module.

13. The apparatus of claim 11, wherein, the downlink scheduling entity module comprises a trigger module;
    the trigger module is adapted to, when the user equipment is in the uplink out-of-synchronization state and there exists uplink or downlink data to be transmitted,
    address the user equipment by using an H-RNTI, and send synchronization initiating information instructing the initiation of the enhanced random access to the user equipment via a control channel used for allocating downlink resources; or address the user equipment by using an E-RNTI, and send synchronization initiating information instructing the initiation of the enhanced random access to the user equipment via a control channel used for allocating uplink resources.

14. The apparatus of claim 11, wherein, the uplink scheduling entity module comprises a first storage module and a first feedback module;
   the first storage module is adapted to store an E-RNTI and an H-RNTI of each user equipment; and
   the first feedback module is adapted to obtain the E-RNTI of the user equipment, determine the H-RNTI corresponding to the user equipment by querying the first storage module, and feed back the H-RNTI corresponding to the user equipment to the downlink scheduling entity.

15. The apparatus of claim 11, wherein, the downlink scheduling entity module comprises a second storage module and a determination module;
   the second storage module is adapted to store an E-RNTI and an H-RNTI of each user equipment; and
   the determination module is adapted to receive the E-RNTI of the user equipment fed back by the uplink scheduling entity module and determine the H-RNTI corresponding to the user equipment by querying the second storage module.

16. The apparatus of claim 11, wherein, the downlink scheduling entity module comprises a notifying module, and the uplink scheduling entity module comprises a selecting module;
   the notifying module is adapted to notify the uplink scheduling entity module of the identifier corresponding to the user equipment on which the enhanced random access synchronization is required when the downlink scheduling entity module triggers the uplink enhanced random access synchronization process; and
   the selecting module is adapted to receive the user equipment identifier sent by the notifying module, and select and feed back the user equipment identifier corresponding to the user equipment on which the uplink enhanced random access synchronization process is triggered to the downlink scheduling entity module after obtaining all user equipment identifiers.

17. The apparatus of claim 11, further comprising: a first recording module and a second recording module;
   the first recording module is adapted to, after the downlink scheduling entity module triggers the uplink enhanced random access synchronization process, record a time period during which the downlink scheduling entity module does not receive a feedback indicating that the user equipment has accomplished the synchronization, and notify the downlink scheduling entity module to re-trigger the uplink enhanced random access synchronization process if the time period exceeds a predetermined time threshold; and
   the second recording module is adapted to record times the downlink scheduling entity module consecutively triggers the uplink enhanced random access synchronization process, and delete a service link corresponding to the user equipment or transfer the service link corresponding to the user equipment to another channel if the times exceed a predetermined threshold of times.

18. The apparatus of claim 11, further comprising: a centralized processing module, wherein,
   the centralized processing module is adapted to receive a detection result sent by the detection module and forward the detection result to the downlink scheduling entity module, and determine whether the uplink enhanced random access synchronization process of the user equipment needs to be triggered according to a trigger request sent by the downlink scheduling entity module; and store E-RNTIs and H-RNTIs of all user equipments, determine the H-RNTI of the user equipment according to the received E-RNTI of the user equipment sent by the uplink scheduling entity module, and send the H-RNTI of the user equipment to the downlink scheduling entity module.

* * * * *